(12) United States Patent
Delk

(10) Patent No.: US 10,452,803 B2
(45) Date of Patent: Oct. 22, 2019

(54) POWER GRID INSERTION TECHNIQUE

(71) Applicant: ARM Limited, Cambridge (GB)

(72) Inventor: Karen Lee Delk, Austin, TX (US)

(73) Assignee: ARM Limited, Cambridge (GB)

( * ) Notice: Subject to any disclaimer, the term of this patent is extended or adjusted under 35 U.S.C. 154(b) by 154 days.

(21) Appl. No.: 15/418,593

(22) Filed: Jan. 27, 2017

(65) Prior Publication Data

US 2018/0218106 A1    Aug. 2, 2018

(51) Int. Cl.
  *G06F 9/455*     (2018.01)
  *G06F 17/50*     (2006.01)

(52) U.S. Cl.
  CPC ...... *G06F 17/5077* (2013.01); *G06F 2217/06* (2013.01); *G06F 2217/12* (2013.01)

(58) Field of Classification Search
  USPC .......................... 716/111, 118, 119, 126, 127
  See application file for complete search history.

(56) References Cited

U.S. PATENT DOCUMENTS

| | | | | |
|---|---|---|---|---|
| 2002/0065643 A1* | 5/2002 | Hirano | ............... | G06F 17/5036 703/19 |
| 2003/0066041 A1* | 4/2003 | Saxena | ............... | G06F 17/5077 716/127 |
| 2006/0080630 A1* | 4/2006 | Lin | ............... | G06F 17/5077 716/115 |
| 2008/0120586 A1* | 5/2008 | Hoerold | ............... | G06F 17/5068 716/52 |
| 2011/0102076 A1* | 5/2011 | Ogata | ............... | H01L 27/0207 327/565 |
| 2014/0103959 A1* | 4/2014 | Andreev | ............... | H03K 19/018585 326/41 |
| 2014/0103985 A1* | 4/2014 | Andreev | ............... | H03K 5/131 327/262 |

OTHER PUBLICATIONS

Delk, et al.; U.S. Appl. No. 15/418,602; filed Jan. 27, 2017.

* cited by examiner

*Primary Examiner* — Brian Ngo
(74) *Attorney, Agent, or Firm* — Pramudji Law Group PLLC; Ari Pramudji (57) ABSTRACT

Various implementations described herein are directed to an apparatus. The apparatus may include a region identifier module that receives user defined parameters for modifying a power grid layout and identifies a region of the power grid layout for strap insertion based on the user defined parameters. The apparatus may include a track identifier module that identifies track locations in the region of the power grid layout for strap insertion. The apparatus may include a strap placement module that inserts at least one strap in the region of the power grid layout based on pre-determined rules for strap insertion.

20 Claims, 7 Drawing Sheets

POWER GRID INSERTION TECHNIQUE

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

Integrated circuits typically include wires (or other conductors) that are formed to transfer power and other electrical signals. Each wire may have a wire pitch that refers to a sum of a width and space of the wire. Standard cell (SC) placement and routing tools typically involve routing wires on predetermined pitches and at predetermined positions within various layers on integrated circuits. Some routing tools are used to route or insert one or more or all power supplies across an entire floorplan and not just where needed. Unfortunately, this can waste routing resources and adversely affect power, performance, and area (PPA) of an integrated circuit. This can also create restrictive power grid patterns for some power supplies, which can reduce flexibility of a power grid design.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein refer to and are directed to providing power grid insertion schemes and techniques in accordance with various implementations described herein. The power grid insertion schemes and techniques provide for target pitch based power grid strap and via insertion. Some parts of a power grid are localized, and the main part of the power grid is not interrupted to insert additional localized structures, as that may be harmful to overall supply integrity. The schemes and techniques described herein search, find, and locate legal locations in a given area (i.e., region) to insert localized parts (i.e., sub-regions) of the power grid while attempting to maintain a user's target pitch (i.e., distance) between the objects to be inserted.

Various implementations of providing various power grid insertion schemes and techniques will now be described in detail herein with reference to FIGS. 1-5.

Figure 1:
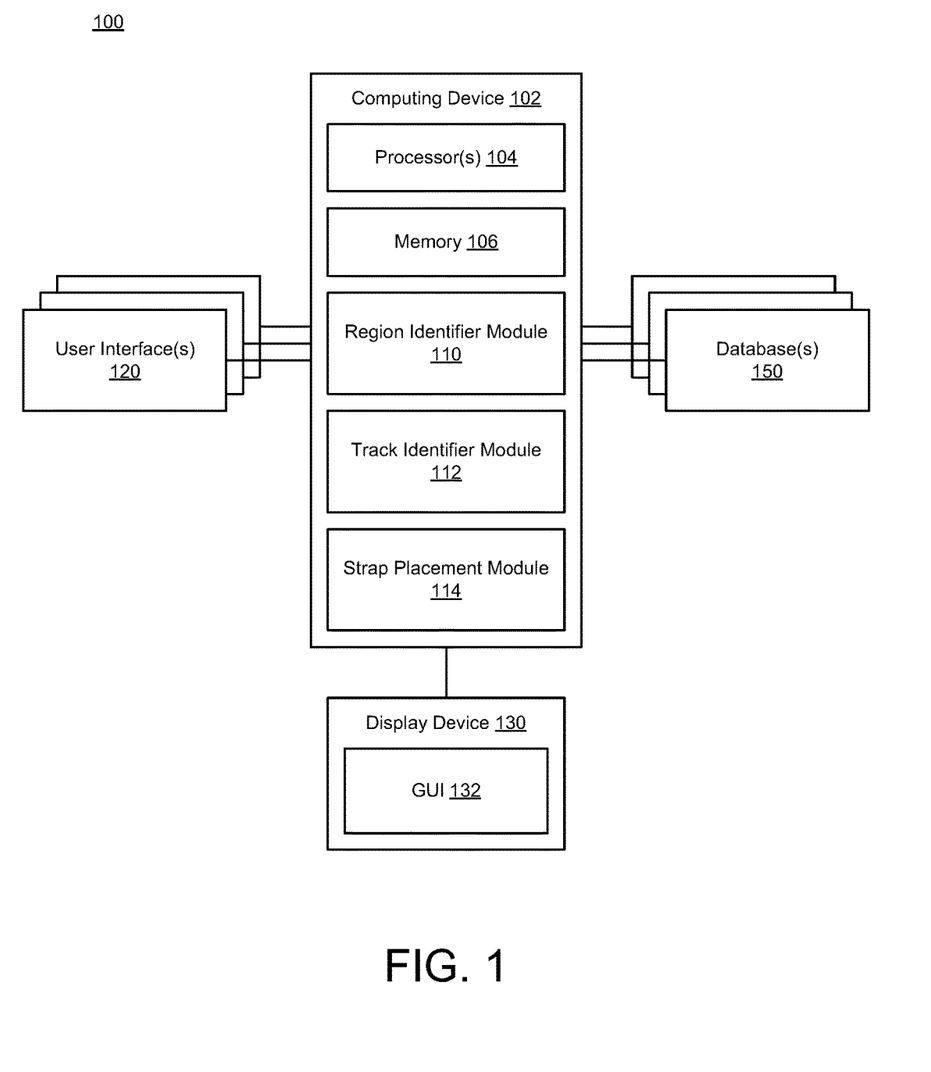
FIG. 1 illustrates a block diagram of a system for implementing a power grid insertion technique in accordance with various implementations described herein.

FIG. 1 is a block diagram illustrating one embodiment of an apparatus 100 that utilizes a computing device 102 for implementing power grid insertion schemes and techniques with various methods associated therewith.

In reference to FIG. 1, the apparatus 100 may be implemented as a system having the computing device 102 purposed for power grid insertion, thereby transforming the computing device 102 into a special purpose machine dedicated to implementation of power grid insertion schemes and techniques, as described herein. Thus, the computing device 102 may include standard element(s) and/or component(s), including at least one processor(s) 104, memory 106 (e.g., non-transitory computer-readable storage medium), peripherals, power, and various other computing elements and/or components that are not specifically shown in FIG. 1. Further, as shown in FIG. 1, the apparatus 100 may be associated with a display device 130 (e.g., a monitor or other display) that may be used to provide a graphical user interface (GUI) 132. In some instances, the GUI 132 may be used to receive input from a user (e.g., user input) associated with power grid insertion schemes and techniques. In other instances, one or more other user interfaces (UI) 120 (e.g., one or more other computing devices having GUIs or similar) may be used to receive input from one or more other users (e.g., other user input) associated with power grid insertion schemes and techniques. The apparatus 100 may also be associated with one or more databases 150 that may be configured to store and/or record data and information related to the users and power grid insertion schemes and techniques.

Accordingly, the apparatus 100 may thus include the computing device 102 and instructions stored or recorded on the computer-readable medium 106 (or the one or more databases 150) and executable by the at least one processor 104. The apparatus 100 may be utilized for implementing power grid insertion schemes and techniques. Further, the apparatus 100 may include the display device 130 for providing output to a user, and the display device 130 may include the GUI 132 for receiving input from the user. In some cases, the one or more UIs 120 may be used for providing output to one or more other users and receiving input from the one or more other users.

The computing device 102 may include one or more modules, such as, e.g., a region identifier module 110. In some scenarios, the region identifier module 110 may receive user defined parameters for modifying a power grid layout and identify a region of the power grid layout for strap insertion based on the user defined parameters. The power grid layout may include fabrication parameters for applying an integrated circuit design to a semiconductor wafer. Further, the power grid layout may identify parameter variations within the integrated circuit that allow the integrated circuit to function properly when the integrated circuit is etched onto the semiconductor wafer.

The region may include a user defined region, and the user defined parameters may include the user defined region as provided by a user. The user defined parameters may include a supply target pitch as provided by the user. The region of the power grid layout may be sub-divided into multiple sub-regions, and the supply target pitch may define a number of the track locations in each of the sub-regions.

The computing device 102 may include a track identifier module 112. In some scenarios, the track identifier module 112 may identify track locations in the region of the power grid layout for strap insertion. The track identifier module 112 may retrieve a list of each track location in the region, and the list may include data structures that define track data and information for each track location in the region. The track identifier module 112 may identify obstructions for each track location in the region based on the list of each track location in the region. The obstructions may include pre-existing metals and vias in place prior to strap insertion that inhibit strap insertion. The track identifier module 112 may identify one or more blocked tracks having various types of obstructions that inhibit strap insertion. Further, the track identifier module 112 may check spacing rules for strap insertion, and the spacing rules may identify various adjacent spacing obstructions that inhibit strap insertion for adjacent track locations.

The computing device 102 may include a strap placement module 114. In some scenarios, the strap placement module 114 may insert at least one strap in the region of the power grid layout based on pre-determined rules for strap insertion. In some cases, the strap placement module 114 may select at least one track location that is closest to a center track location within each sub-region (or closest to at least one end portion of each sub-region) and insert the at least one strap in the at least one track location that is closest to the center track location within each sub-region (or closest to the at least one end portion of each sub-region) based on pre-determined rules for strap insertion. The pre-determined rules for strap insertion may include various types of rules for avoiding track locations that are blocked with obstructions. The pre-determined rules for strap insertion may also include various types of rules for avoiding track locations that violate spacing rules for strap insertion. Further, the pre-determined rules for strap insertion may include various types of rules for selecting track locations closest to a center track location (or closest to at least one end portion of each sub-region).

In reference to FIG. 1, the apparatus 100 is shown using various functional blocks or modules that represent discrete functionality. However, it should be understood that such illustration is provided for clarity and convenience, and therefore, it should be appreciated that the various functionalities may overlap or be combined within a described block(s) or module(s), and/or may be implemented by one or more additional block(s) or module(s) that are not specifically illustrated in FIG. 1. Further, it should be understood that various standard and/or conventional functionality that may be useful to the apparatus 100 of FIG. 1 may be included as well even though such standard and/or conventional elements are not illustrated explicitly, for the sake of clarity and convenience.

Figure 2A:
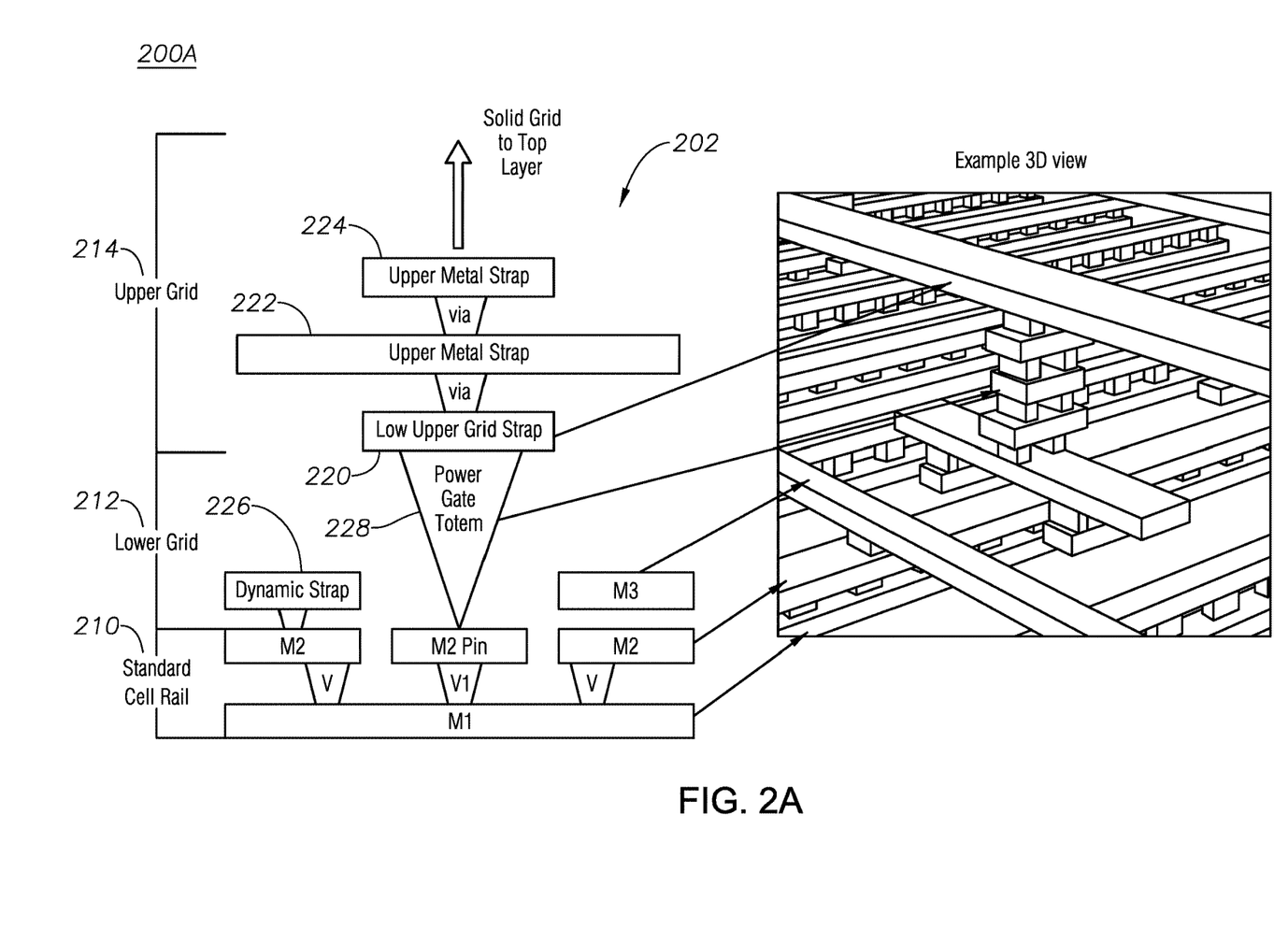
FIGS. 2A-2B illustrate various diagrams of power grid layout architecture in accordance with various implementations described herein.
Figure 2B:
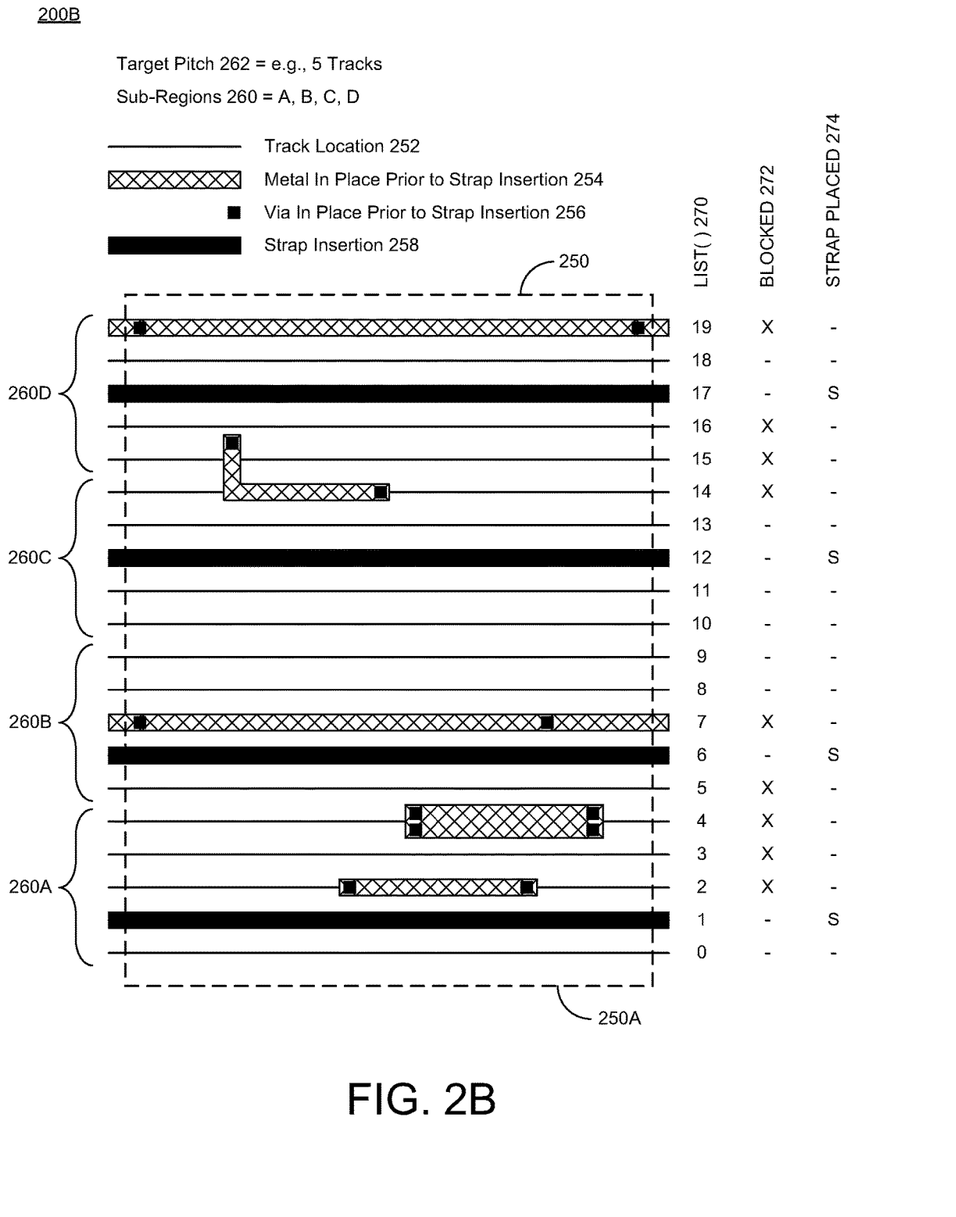

FIGS. 2A-2B illustrate various diagrams of power grid layout architecture in accordance with various implementations described herein.

In particular, FIG. 2A illustrates a diagram of power grid layout architecture 200A along with an example three-dimensional (3D) view thereof. As shown, the power grid layout 200A may include a stack 202 of a standard cell rails 210, a lower grid 212, and an upper grid 214. The stack 202 may include a plurality of layers, such as, e.g., metal layers M1, M2, M3 and vias V, V1. The stack 202 may include a plurality of metal strap layers, such as, e.g., lower upper grid (LUG) strap 220, upper metal straps 222, 224, and a dynamic strap 226. The stack 202 may include a power gate totem 228. In various instances, a strap may refer to a metal wire used by a power grid to supply voltage to an integrated circuit including components thereof. Further, a totem may refer to a metal plus via stack between the standard cell rail and a LUG.

In some implementations, the power grid layout architecture 200A may provide a single supply with a power switch (i.e., power gate totem 228), which has the insertion of the LUG strap 220, the power gate totem 228, the straps 222, 224, 226, and the standard cell power rails 210. Various implementations described herein may provide for power grid insertion schemes and techniques associated with the multiple layers shown in FIG. 2A including, e.g., vertical and/or horizontal layers that a user may perform strap insertion on (except the standard cell rails 210). In some cases, the power grid insertion schemes and techniques may be applied in the case of straps and/or vias, such as, e.g., the M3 strap, the lower upper grid strap 220, and the upper metal straps 224, 226. Thus, the power grid insertion schemes and techniques may be used for any and all layers in horizontal and/or vertical directions. When there is a localized power grid within a larger power grid, the power grid insertion schemes and techniques may identify legal locations, e.g., by interleaving inside a localized power grid in open space between track locations of an existing power grid.

FIG. 2B illustrates a schematic diagram of a region 250 of power grid layout architecture 200B for strap insertion. The region 250 may be a user defined region, and the region 150 may be bounded with a bounding box 250A. The region 250 may include multiple track locations 252 that are identified for strap insertion. The track locations 252 may be arranged in and identified with a grid based pattern, such as, e.g., horizontally (as shown) or vertically. The region 250 may include various objects (or obstructions) in place prior to strap insertion, such as, e.g., metals 254 in place prior to strap insertion and vias 256 in place prior to strap insertion. The region 250 may include one or more straps that are inserted via strap insertion 258, wherein the straps are placed in particular strap locations 250 after strap insertion 258.

The region 250 of the power grid layout 200B may be sub-divided into multiple sub-regions 260A, 260B, 260C, 260D. In some cases, a user may provide user defined parameters that may include a supply target pitch 262 having one or more track locations 252 arranged in a group (or set) as defined by the user. As such, the supply target pitch 262 may define a number of the track locations 252, such as, e.g., 5 tracks, in each of the sub-regions 260A, 260B, 260C, 260D. For the region 250, a LIST( ) 270 may be provided to indicate a numbered list of track locations, such as, e.g., 0, 1, 2, 3, . . . , 19. In various instances, the LIST( ) may be referred to as a track list or track listing.

The LIST( ) 270 may include various data structures that define track information for each track location 0, 1, 2, 3, . . . , 19 in the region 250. The track information may also identify one or more obstructions (e.g., various objects in place prior to strap insertion) for each track location 0, 1, 2, 3, . . . , 19 in the region 250. In some cases, the obstructions may include pre-existing metals 254 and vias 256 in place prior to strap insertion that may inhibit strap insertion. The LIST( ) 270 may also identify one or more blocked tracks 272 having obstructions that may inhibit strap insertion. For instance, as shown in FIG. 2B, track locations 2, 3, 4, 5, 7, 14, 15, 16, and 19 may be indicated as blocked 272 with an (X). In some cases, the blocked track tracks 272 may refer to unavailable tracks or track locations that are not available for strap insertion due to obstructions.

Once blocked track locations have been identified, strap insertion or placement may take place in the region 250, wherein one or more straps 258 may be inserted or placed in one or more available track locations 252 in the region 250. In some cases, at least one track location 252 in each sub-region 260A, 260B, 260C, 260D may be selected for strap insertion that is closest to a center track location within each sub-region 260A, 260B, 260C, 260D (or closest to at least one end portion of each sub-region 260A, 260B, 260C, 260D). For instance, in a first sub-region 260A, a strap 258 may be inserted in a first track location 1, because center track location 2 has an obstruction. Similarly, in a second sub-region 260B, a strap 258 may be inserted in a sixth track location 6, because a center track location 7 has an obstruction. In a third sub-region 260C, a strap 258 may be inserted in a twelfth track location 12, because no obstruction appears in center track location 12. In a fourth sub-region 260D, a strap 258 may be inserted in a seventeenth track location 17, because no obstruction appears in center track location 17. Further, the LIST( ) 270 may be updated to identify one or more strap placements or insertions 274 having a newly inserted strap. For instance, the track locations 1, 6, 12, and 17 may be indicated as having a strap placed 274 as marked with an (S).

As described herein, the straps 258 may be inserted in track locations 252 that are closest to the center track location within each sub-region 260A, 260B, 260C, 260D based on pre-determined rules for strap insertion. As such, the pre-determined rules for strap insertion may include any number of rules including selecting track locations that are closest to the center track location. In some cases, the straps 258 may be inserted in track locations 252 that are closest to at least one end portion of each sub-region 260A, 260B, 260C, 260D based on pre-determined rules for strap insertion. Thus, the pre-determined rules for strap insertion may include any number of rules including selecting track locations that are closest to at least one end portion of a region or sub-region. The pre-determined rules for strap insertion may also include avoiding track locations that are blocked with obstructions. Further, the pre-determined rules for strap insertion may also include avoiding track locations that violate spacing rules for strap insertion. For instance, various spacing rules may identify adjacent spacing obstructions that may inhibit strap insertion for adjacent track locations.

In some implementations, the power grid layout 200B may be associated with data and information related to fabrication parameters for applying an integrated circuit design to a semiconductor wafer. Further, the power grid layout may identify parameter variations within the integrated circuit that allow the integrated circuit to function properly when the integrated circuit is etched onto the semiconductor wafer. Therefore, the power grid layout 200B may be represented as one or more data structures having various data and information related to fabricating an integrated circuit on a semiconductor substrate or wafer, wherein the integrated circuit may be formed of multiple layers including multiple logic layers, multiple metal layers, and any number of layer coupling vias.

In various implementations, the term strap may refer to a metal strap (or some other type of conductive strap) that may be used to build the power grid and various routes in the power grid. In some cases, the term pitch may refer to a track (or a track location) associated with a unit of measure that is equal to (or substantially similar to) a minimum metal width and/or a minimum metal space. In other cases, tracks on a layer may or may not have a similar pitch. In some other cases, the term target pitch may refer to any number of pitches that may be between straps. In still some other cases, the term target pitch may refer to a desired distance between straps. Further, in some cases, the term pitch (or target pitch) may refer to a fundamental pitch that may be used for vertical pitches and/or horizontal pitches of straps.

In some implementations, the power straps may include at least one of metal wires, power switches (which may be referred to as power gates), and/or vias. In some other implementations, the metal wire on any particular layer may include two or more parallel wires on that same layer.

Figure 3A:
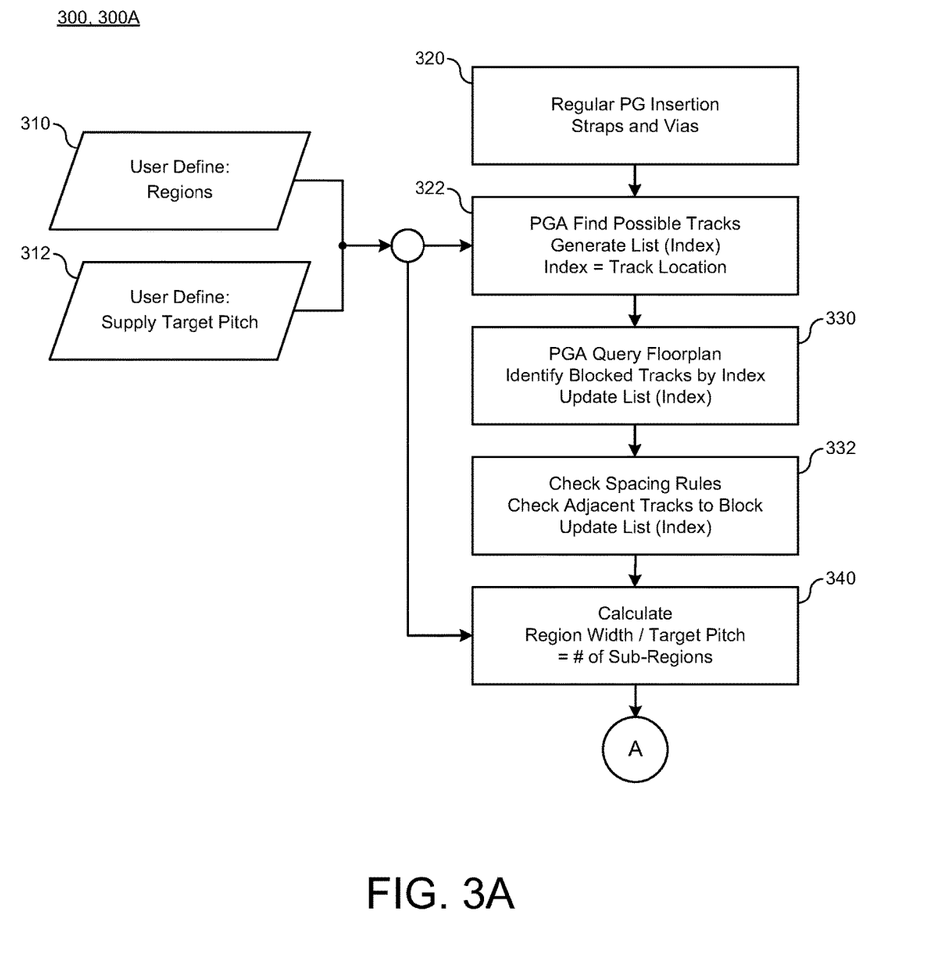
FIGS. 3A-3B illustrate a process flow diagram of a method for implementing power grid insertion in accordance with various implementations described herein.
Figure 3B:
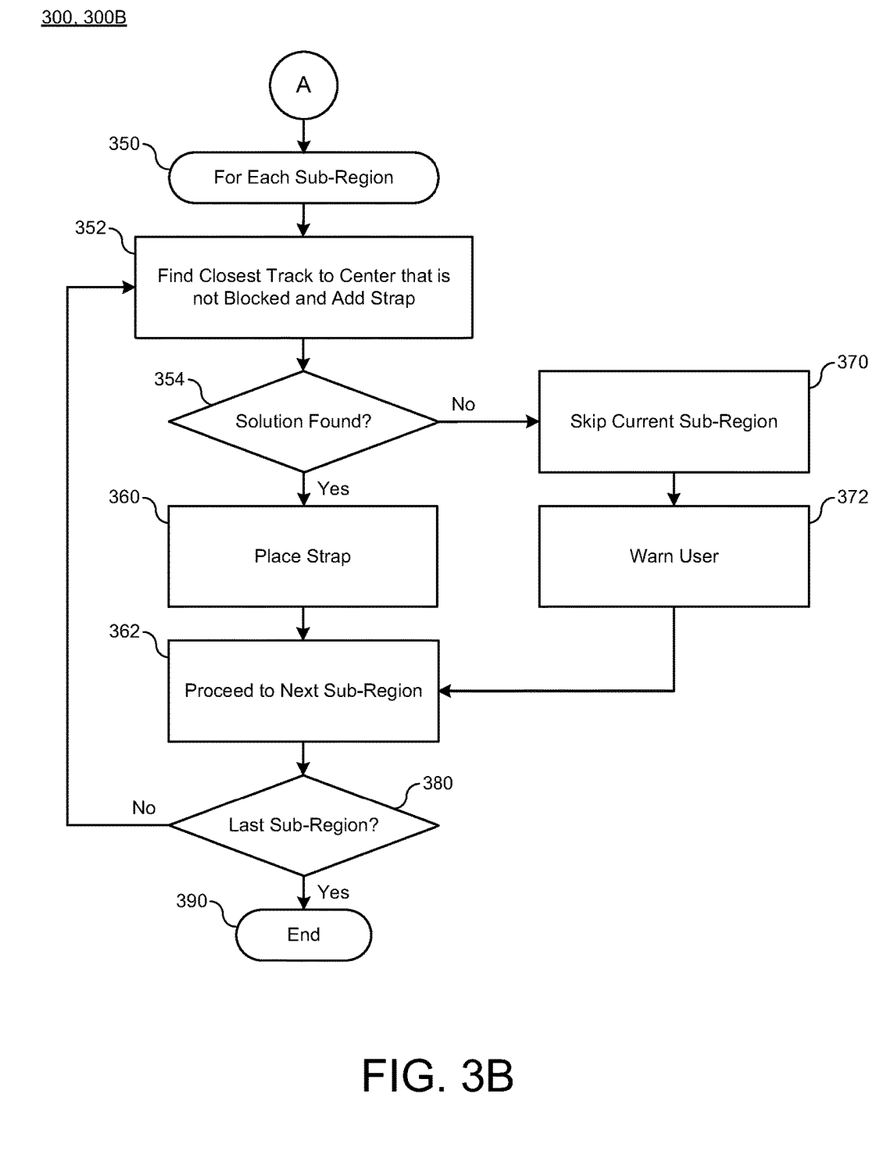

FIGS. 3A-3B illustrate a diagram of a method 300 for implementing power grid insertion in accordance with implementations described herein. In particular, FIG. 3A illustrates a first portion 300A of the process flow for method 300, and FIG. 3B illustrates a second portion 300B of the process flow for method 300.

It should be understood that even though method 300 may indicate a particular order of operation execution, in some cases, various certain portions of operations may be executed in a different order, and on different systems. In some other cases, additional operations and/or steps may be added to and/or omitted from method 300. Method 300 may be implemented in hardware and/or software. If implemented in hardware, method 300 may be implemented with various components, such as described herein above in reference to FIGS. 1-2B. If implemented in software, method 300 may be implemented as a program or software instruction process that may be configured for implementing various power grid insertion schemes and techniques as described herein. Further, if implemented in software, various instructions related to implementing method 300 may be stored in memory, wherein a computer, a server, or various other computing devices having a processor and memory may be configured to perform method 300.

In reference to FIGS. 3A-3B, method 300 may be utilized for implementing various power grid insertion schemes and techniques as described herein. For instance, method 300 may be utilized for inserting power grid straps and/or vias while accounting for already placed objects on a same layer(s) or a neighbouring layer(s) while attempting to meet target spacing between inserted straps and/or vias. The secondary power supply to level shifters and isolation circuits does not have to cover an entire design floorplan, and as such, the secondary power supply may only be placed where the level shifters and isolation circuits are going to be physically located.

FIG. 3A illustrates the first portion 300A of the process flow for method 300 in accordance with implementations described herein.

At blocks 310, 312, method 300 may receive, retrieve, or obtain user defined parameters. In particular, at block 310, method 300 may receive user defined regions, and at block 312, method 300 may receive a user defined supply target pitch. In some instances, a user may provide the user defined parameters that identify a rectangular or rectilinear REGION that may be designated for strap insertion. The user defined parameters may also identify how far apart the straps and/or vias are to be from each other (TARGET PITCH). FIG. 2B provides an instance of a REGION 200B having multiple (e.g., 4) SUB-REGIONs A, B, C, D with each SUB-REGION having multiple (e.g., 5) tracks. In some cases, a REGION may be defined as a rectangular area where a user wants supplies to be added, and a SUB-REGION may be defined as a location between target pitches are found.

At block 320, method 300 may receive regular power grid (PG) insertion straps and vias. The term regular may refer to already placed objects and structures, and thus, the regular PG insertion straps and vias may refer to already placed PG insertion straps and vias that may be considered obstructions to (or objects and structures in the way of) newly placed PG insertion straps and vias. In some instances, regular power and ground supply straps and vias may be inserted into the floorplan. Power switches may also be inserted, if the power domain is to be gated. The straps and vias may only occur in certain tracks (or track locations).

At block 322, method 300 may receive the user defined parameters from blocks 310, 312, find or locate possible track locations based on the user defined parameters, and then generate an indexed list (or index list) of the possible track locations. In some instances, method 300 may identify where the possible insertion locations (tracks) for the straps and vias may be in this region, and method 300 turns this information into a LIST with one entry for each track. One or more or all of the tracks in the LIST may be marked as open. In some cases, a LIST refers to a data structure that holds some or all track information.

At block 330, method 300 may query a floorplan of the power grid architecture to identify blocked tracks by the index list, and then, method 300 may update the index list based on the identified blocked tracks. Further, at block 332, method 300 may check spacing rules by checking adjacent tracks to block, and then, method 300 may update the index update list based on the adjacent tracks that are blocked.

In some instances, method 300 may query the floorplan to find the locations of already placed straps and vias on a given layer within the user specified REGION, and method 300 may convert the locations into an index in the track LIST and then mark that index as BLOCKed. Since the straps and vias may need a certain distance between them to be design rule clean, method 300 may also mark an appropriate number of adjacent indices as BLOCKed. Further, some tracks or some track locations may be BLOCKed due to rules in reference to design rule compliance (DRC). In some cases, the term BLOCKed refers to a blockage within a track or track location.

At block 340, method 300 may calculate a number of sub-regions by dividing a region width by a target pitch (region width/target pitch=# of sub-regions). In some instances, based on the TARGET PITCH and the size of the REGION, method 300 may determine how many straps will fit and not exceed the TARGET PITCH when placed ideally, and method 300 may then divide the region by this amount. Further, method 300 may place at least one strap in each SUB-REGION.

FIG. 3B illustrates the second portion 300B of the process flow for method 300 in accordance with implementations described herein.

At block 350, for each sub-region, and at block 352, method 300 may find a closest track to center that is not BLOCKed, and add a strap. In some instances, within each SUB-REGION, method 300 may find an area that has a largest gap between BLOCKed locations, place a strap in a center of this area. However, if the strap cannot legally be placed (e.g., due to spacing rules and constraints), then method 300 may leave this SUB-REGION without the secondary supply. In some other instances, at blocks 350 and 352, method 300 may find a track location closest to at least one end portion within one or more SUB-REGIONS. As described further herein, strap insertion may include selecting a track location closest to a center track location and/or selecting a track location closest to at least one end portion of a region or a sub-region.

At decision block 354, method 300 may decide or determine whether a solution is found. If a solution is found at block 354, then at block 360, method 300 may place a strap, and at block 362, method 300 may proceed to a next sub-region. In some instances, method 300 may place multiple straps (e.g., at least 2 straps) in each REGION regardless of the user's TARGET PITCH. This may be done so as to assist with supply integrity.

Otherwise, if no solution is found at block 354, then at block 370, method 300 may skip the current sub-region, and at block 372, method 300 may warn the user that the current sub-region was skipped because no solution was found at the current sub-region. Next, after block 372, method 300 may proceed to a next sub-region at block 362.

At decision block 380, method 300 may decide or determine whether or not the current sub-region was the last sub-region. If yes, then method 300 terminates in block 390. If no, then method 300 may return to block 352 to process the next sub-region. As such, method 300 may repeat blocks 352-380 until the last sub-region is processed.

Some benefits of implementing method 300 includes automation that enables reliable, repeatable, and robust insertion of secondary supplies that may otherwise have to be done manually, which may be prone to human error. The time savings of method 300 may allow for faster turnaround times and may enable end users to evaluate various configurations to ensure their design meets a desired target. Further, method 300 may be directly applicable to inserting straps and/or vias in some other contexts. In addition to inserting secondary supplies, method 300 may insert straps above memory macros, which may have one or more power supplies plus a ground supply. The supplies may not use a same density over the memory macro. Further, method 300 may allow the end users to control individual supply density through target pitches, and method 300 may be used to figure out how to place the straps and/or vias around each other. In some cases, method 300 may also be used for hot spot fixing.

Figure 4:
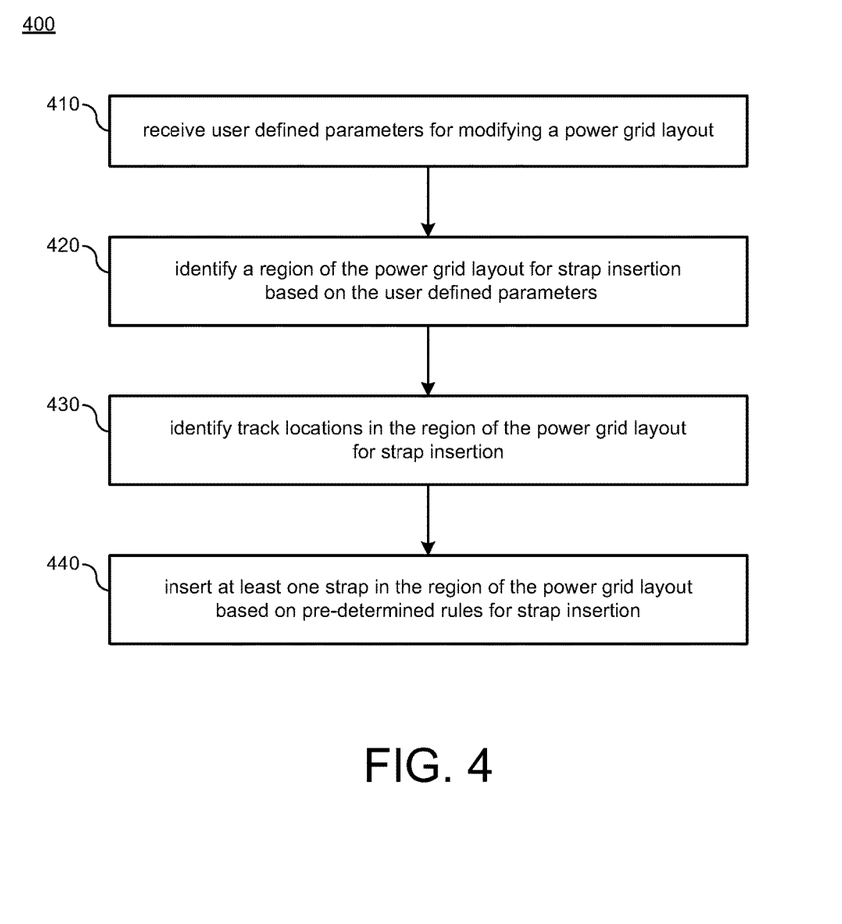
FIG. 4 illustrates another process flow diagram of a method for implementing power grid insertion in accordance with various implementations described herein.

FIG. 4 illustrates a process flow diagram of a method 400 for implementing power grid insertion in accordance with various implementations described herein.

It should be understood that even though method 400 may indicate a particular order of operation execution, in some cases, various certain portions of operations may be executed in a different order, and on different systems. In some other cases, additional operations and/or steps may be added to and/or omitted from method 400. Method 400 may be implemented in hardware and/or software. If implemented in hardware, method 400 may be implemented with various components, such as described herein above in reference to FIGS. 1-2B. If implemented in software, method 400 may be implemented as a program or software instruction process that may be configured for implementing various power grid insertion schemes and techniques as described herein. Further, if implemented in software, various instructions related to implementing method 400 may be stored in memory, wherein a computer, a server, or various other computing devices having a processor and memory may be configured to perform method 400.

In reference to FIG. 4, method 400 may be utilized for implementing various power grid insertion schemes and techniques.

At block 410, method 400 may receive user defined parameters from a user for modifying a power grid layout. The power grid layout may include fabrication parameters for applying an integrated circuit design to a semiconductor wafer. In some scenarios, the power grid layout may further identify parameter variations within the integrated circuit that allow the integrated circuit to function properly when the integrated circuit is etched onto the semiconductor wafer.

At block 420, method 400 may identify a user defined region of the power grid layout for strap insertion based on the user defined parameters provided by the user. In some scenarios, the user defined parameters include a supply target pitch as provided by a user. In some other scenarios, the region of the power grid layout may be sub-divided into multiple sub-regions, and the supply target pitch may define a number of the track locations in each of the sub-regions.

At block 430, method 400 may identify track locations in the region of the power grid layout for strap insertion, which may include identifying obstructions for each track location in the region of the power grid layout. The obstructions may include pre-existing metals and vias in place prior to strap insertion that inhibit strap insertion.

At block 440, method 400 may insert at least one strap in the region of the power grid layout based on pre-determined rules for strap insertion. The pre-determined rules for strap insertion may include a first rule that avoids track locations that are blocked with obstructions. The pre-determined rules for strap insertion may include a second rule that avoids track locations that violate spacing rules for strap insertion. Further, the pre-determined rules for strap insertion may include a third rule that selects track locations closest to a center track location (or closest to at least one end portion of the region).

In some scenarios, at block 440, method 400 may retrieve a list of each track location in the region, and the list may include data structures that define track information for each track location in the region. Further, at block 440, method 400 may identify one or more blocked tracks having obstructions that inhibit strap insertion. Still further, at block 440, method 400 may check spacing rules for strap insertion, which may identify adjacent spacing obstructions that inhibit strap insertion for adjacent track locations.

Figure 5:
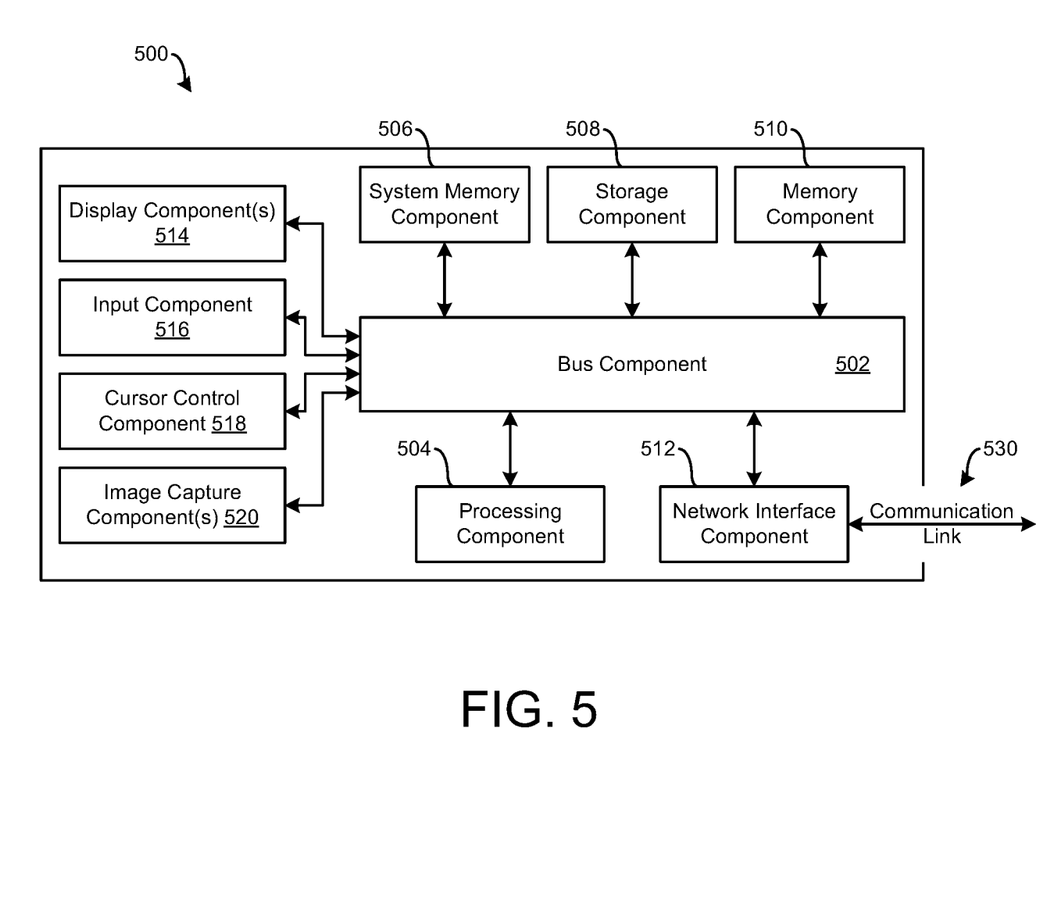
FIG. 5 illustrates a block diagram of a computing device in accordance with various implementations described herein.

FIG. 5 is a block diagram of a computing device 500 suitable for implementing various implementations described herein, including, e.g., the computing device 102 and components associated therewith in FIG. 1. As such, the computing device 500 may be embodied as the computing device 102 and be configured for network communication with various other computing devices over a wired or wireless network.

The computer device 500 may be implemented as various types of computing devices, such as, e.g., a server, a personal computer (PC), a laptop, a notebook, a mobile communication device, or similar. The computer device 500 may include a bus 502 (or other communication mechanism for communicating information) that interconnects the various subsystems and/or components, such as, e.g., processing component 504 (e.g., processor, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., CRT or LCD), input component 516 (e.g., keyboard), cursor control component 518 (e.g., mouse or trackball), and image capture component 520 (e.g., analog or digital camera). In some implementations, disk drive component 510 may comprise a database having one or more disk drive components.

The computer device 500 performs various specific operations by processor 504 executing one or more sequences of one or more instructions contained in system memory component 506. Such instructions may be read into system memory component 506 from another computer readable medium, such as static storage component 508 or disk drive component 510. In some cases, hard-wired circuitry may be used in place of or in combination with software instructions to implement the various schemes and/or techniques described herein.

Logic may be encoded in a computer readable medium, which may refer to any medium that participates in providing instructions to processor 504 for execution. Such a medium may take many forms, including but not limited to, non-volatile media and volatile media. In various implementations, non-volatile media includes optical or magnetic disks, such as disk drive component 510, and volatile media includes dynamic memory, such as system memory component 506. In some implementations, data and information related to execution instructions may be transmitted to computer device 500 via a transmission media, such as in the form of acoustic or light waves, including those generated during radio wave and infrared data communications. In various implementations, transmission media may include coaxial cables, copper wire, and/or fiber optics, including wires that comprise bus 502.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various implementations, execution of instruction sequences to practice the schemes and techniques described herein may be performed by computer device 500. In other implementations described herein, a plurality of computer systems 500 coupled by communication link 530 (e.g., LAN, WLAN, PTSN, and/or various other wired or wireless networks, including telecommunications, mobile, and/or cellular phone networks) may perform instruction sequences to practice implementations of the present disclosure in coordination with one another.

In various implementations, the computer device 500 may transmit and receive messages, data, information and instructions, including programs (i.e., application code) through communication link 530 and communication interface 512. Further, the received program code may be executed by the processor 504 as received and/or stored in disk drive component 510 or some other non-volatile storage component for execution.

Described herein are implementations of an apparatus. The apparatus may include a region identifier module that receives user defined parameters for modifying a power grid layout and identifies a region of the power grid layout for strap insertion based on the user defined parameters. The apparatus may include a track identifier module that identifies track locations in the region of the power grid layout for strap insertion. The apparatus may include a strap placement module that inserts at least one strap in the region of the power grid layout based on pre-determined rules for strap insertion.

Described herein are implementations of a method. The method may include receiving user defined parameters from a user for modifying a power grid layout. The power grid layout may include fabrication parameters for applying an integrated circuit design to a semiconductor wafer. The method may include identifying a user defined region of the power grid layout for strap insertion based on the user defined parameters provided by the user. The method may include identifying track locations in the region of the power grid layout for strap insertion, including identifying obstructions for each track location in the region of the power grid layout. The obstructions may include pre-existing metals and vias in place prior to strap insertion that inhibit strap insertion. The method may include inserting at least one strap in the region of the power grid layout based on pre-determined rules for strap insertion.

Described herein are implementations of a non-transitory computer-readable medium having stored thereon a plurality of computer-executable instructions that, when executed by a computer, cause the computer to receive user defined parameters from a user for modifying a power grid layout. The power grid layout may include fabrication parameters for applying an integrated circuit design to a semiconductor wafer. The instructions may cause the computer to identify a user defined region of the power grid layout for strap insertion based on the user defined parameters provided by the user. The instructions may cause the computer to identify track locations in the region of the power grid layout for strap insertion, including identifying obstructions for each track location in the region of the power grid layout. The obstructions may include pre-existing metals and vias in place prior to strap insertion that inhibit strap insertion. The instructions may cause the computer to insert at least one strap in the region of the power grid layout based on pre-determined rules for strap insertion.

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a region identifier module that receives user defined parameters for modifying a power grid layout and identifies a region of the power grid layout for strap insertion based on the user defined parameters;
a track identifier module that identifies track locations in the region of the power grid layout for strap insertion;
a strap placement module that identifies at least one track location of the track locations in the region of the power grid layout based on pre-determined rules for strap insertion, wherein the strap placement module selects a closest track location to the at least one track location based on the pre-determined rules when the at least one track location is unavailable; and
wherein the strap placement module inserts at least one strap in the closest track location.

2. The apparatus of claim 1, wherein the power grid layout includes fabrication parameters for applying an integrated circuit design to a semiconductor wafer.

3. The apparatus of claim 2, wherein the power grid layout identifies parameter variations within the integrated circuit that allow the integrated circuit to function properly when the integrated circuit is etched onto the semiconductor wafer.

4. The apparatus of claim 1, wherein the region includes a user defined region, and wherein the user defined parameters include the user defined region as provided by a user.

5. The apparatus of claim 1, wherein the user defined parameters include a supply target pitch as provided by a user.

6. The apparatus of claim 5, wherein the region of the power grid layout is sub-divided into multiple sub-regions, and wherein the supply target pitch defines a number of the track locations in each of the sub-regions.

7. The apparatus of claim 6, wherein the strap placement module selects the closest track location to one of a center track location within each sub-region or closest track location to at least one end portion of each sub-region.

8. The apparatus of claim 1, wherein the track identifier module retrieves a list of each track location in the region, and wherein the list includes data structures that define track information for each track location in the region.

9. The apparatus of claim 8, wherein the track identifier module identifies obstructions for each track location in the region based on the list of each track location in the region.

10. The apparatus of claim 9, wherein the obstructions include pre-existing metals and vias in place prior to strap insertion that inhibit strap insertion.

11. The apparatus of claim 1, wherein the track identifier module identifies one or more blocked tracks having obstructions that inhibit strap insertion.

12. The apparatus of claim 1, wherein the track identifier module checks spacing rules for strap insertion, and wherein the spacing rules identify adjacent spacing obstructions that inhibit strap insertion for adjacent track locations.

13. The apparatus of claim 1, wherein the pre-determined rules for strap insertion include avoiding track locations that are blocked with obstructions.

14. The apparatus of claim 1, wherein the pre-determined rules for strap insertion include avoiding track locations that violate spacing rules for strap insertion.

15. The apparatus of claim 1, wherein the at least one track location is at least one of a center track location and a track location one end portion of the region.

16. A method, comprising:
receiving user defined parameters from a user for modifying a power grid layout, wherein the power grid layout includes fabrication parameters for applying an integrated circuit design to a semiconductor wafer;
identifying a user defined region of the power grid layout for strap insertion based on the user defined parameters provided by the user;
generating a list of track locations in the user defined region of the power grid layout for strap insertion, including identifying obstructions for each track location in the user defined region of the power grid layout, wherein the obstructions include pre-existing metals and vias in place prior to strap insertion that inhibit strap insertion;
selecting at least one track location of the track locations in the region of the power grid layout based on pre-determined rules for strap insertion;
inserting at least one strap in the selected at least one track location; and
updating the generated list of track location by identifying a new obstruction based on the at least one track location.

17. The method of claim 16, wherein the power grid layout further identifies parameter variations within the integrated circuit that allow the integrated circuit to function properly when the integrated circuit is etched onto the semiconductor wafer.

18. The method of claim 16, wherein the user defined parameters include a supply target pitch as provided by a user, and wherein the region of the power grid layout is sub-divided into multiple sub-regions, and wherein the supply target pitch defines a number of the track locations in each of the sub-regions.

19. The method of claim 16, wherein the pre-determined rules for strap insertion include one or more of:
a first rule that avoids track locations that are blocked with obstructions,
a second rule that avoids track locations that violate spacing rules for strap insertion, and
a third rule that selects track locations closest to a center track location or closest to at least one end portion of the region.

20. A non-transitory computer-readable medium having stored thereon a plurality of computer-executable instructions that, when executed by a computer, cause the computer to:
receive user defined parameters from a user for modifying a power grid layout, wherein the power grid layout includes fabrication parameters for applying an integrated circuit design to a semiconductor wafer;
identify a user defined region of the power grid layout for strap insertion based on the user defined parameters provided by the user;
generate a list of track locations in the user defined region of the power grid layout for strap insertion, including identifying obstructions for each track location in the user defined region of the power grid layout, wherein the obstructions include pre-existing metals and vias in place prior to strap insertion that inhibit strap insertion;
select at least one track location of the track locations in the region of the power grid layout based on pre-determined rules for strap insertion;
insert at least one strap in the selected at least one track location; and
update the generated list of track location by identifying a new obstruction based on the at least one track.

\* \* \* \* \*